United States Patent [19]

Ulvestad et al.

[11] 3,997,305
[45] Dec. 14, 1976

[54] SUPPORT FOR BOTTOM REMOVAL DUST COLLECTOR BAG ASSEMBLY

[75] Inventors: Edward A. Ulvestad, Naperville; Charles M. Harris, Palatine, both of Ill.

[73] Assignee: Flex-Kleen Corporation, Chicago, Ill.

[22] Filed: Mar. 5, 1976

[21] Appl. No.: 664,192

[52] U.S. Cl. .............................. 55/341 R; 55/379; 55/381; 55/DIG. 26

[51] Int. Cl.² ........................................ B01D 46/02

[58] Field of Search ............ 55/302, 376, 377, 378, 55/379, 381, 492, DIG. 26, 374, 341 R

[56] References Cited

UNITED STATES PATENTS

| 3,680,285 | 8/1972 | Wellan et al. | 55/379 |
| 3,777,458 | 12/1973 | Dence | 55/302 |
| 3,874,857 | 4/1975 | Hunt et al. | 55/379 |
| 3,951,627 | 4/1976 | Barr, Jr. et al. | 55/379 |

FOREIGN PATENTS OR APPLICATIONS 887,772 1/1962 United Kingdom ................ 55/378

Primary Examiner—Frank W. Lutter
Assistant Examiner—David L. Lacey
Attorney, Agent, or Firm—J. Patrick Cagney

[57] ABSTRACT

A bottom removal type of filter bag assembly for reverse blow-back type dust collectors is mounted on a permanent support structure that is welded in place to a depending integral collar portion of the dust collector tube sheet. The permanent support has a stepped diameter wall structure having a reduced upper end portion for force fit insertion in the tube sheet collar and having an intermediate shoulder to engage axially against the end of the collar.

3 Claims, 5 Drawing Figures

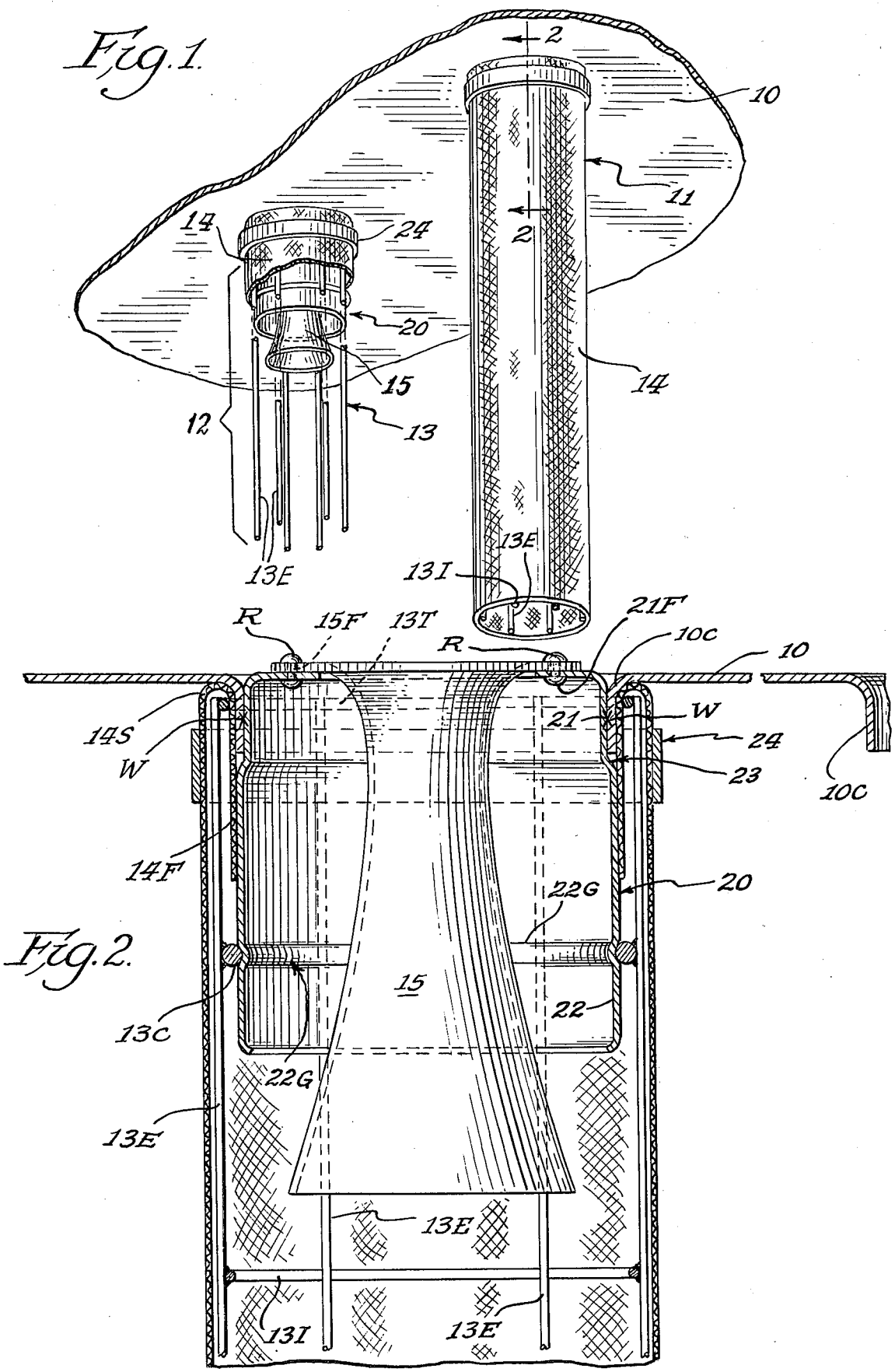

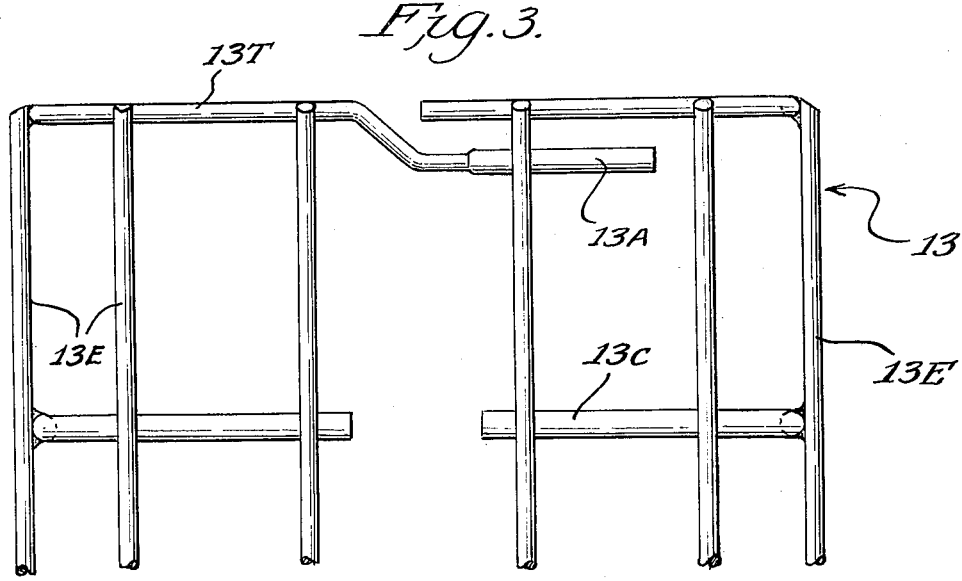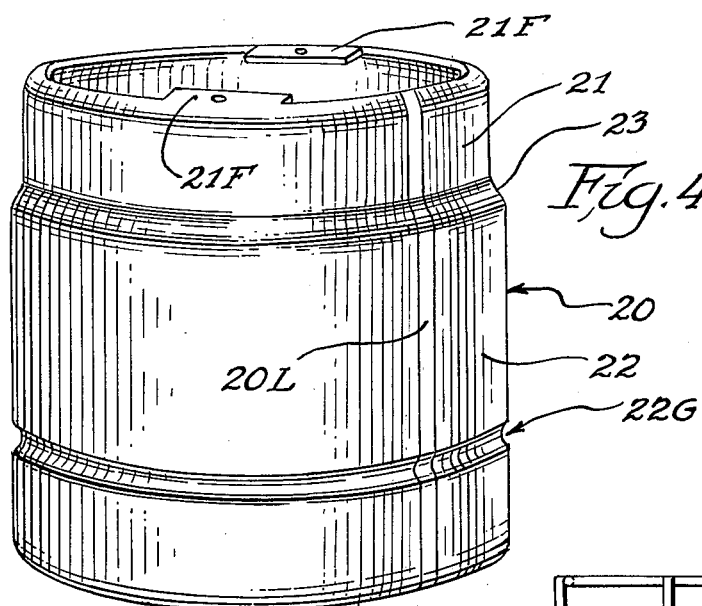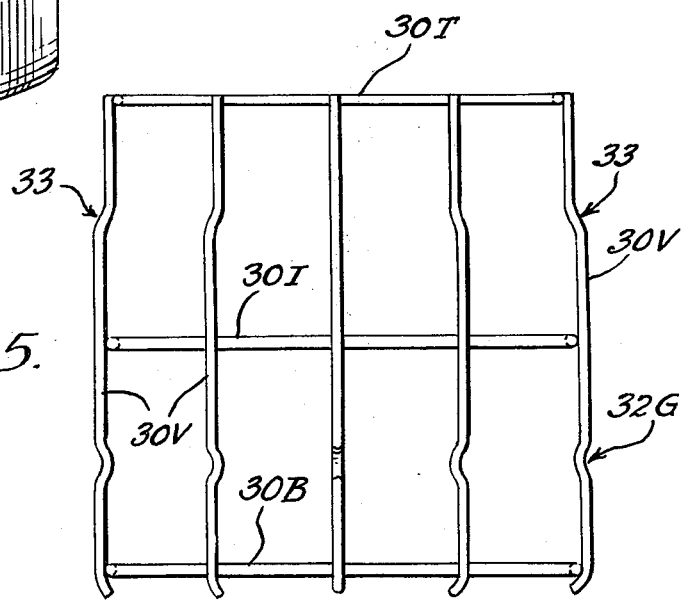

SUPPORT FOR BOTTOM REMOVAL DUST COLLECTOR BAG ASSEMBLY

BACKGROUND OF THE INVENTION

In a conventional reverse blow-back type of dust collector, a large number of sleeve-type filter bags are suspended from a tube sheet by means of bag cups which are individually engaged in air sealed relation to the tube sheet. In the present day commercial types of blow-back dust collectors, each bag cup carries an air nozzle which also is air sealed relative to the bag cup and the tube sheet.

In some instances, such dust collectors may incorporate as many as 500 filter bags, each having a bag cup and air nozzle assembly, each of which assemblies must be individually air sealed to the main tube sheet structure. Normally the tube sheet structure is formed in sections, each of which may carry as many as 60 bag cups, although from four to 32 cups per tube sheet section is typical. The tube sheet sections are welded or bolted together to lie in a common plane within the dust collector.

One of the most time-consuming and expensive fabrication operations in the manufacture of dust collectors of this type arises in connection with the mounting of each of the bag cups and air nozzles in effectively air sealed relation to the tube sheet. In the past, this operation has been performed by welding the bag cup and air nozzle in place or by gasketing the bag cup and air nozzle in place and riveting the parts to the tube sheet.

SUMMARY OF THE INVENTION

The present invention provides improved bag, cage and nozzle mounting arrangements for reverse blow-back type dust collectors for insuring the desired effective air sealing to the tube sheet while reducing the labor requirements and the cost of manufacture and servicing.

More particularly, the invention relates to reverse blow-back type dust collectors wherein each bag assembly includes an elongated skeletal cage of the split ring mounted type, an elongated bag having an open end sleeve portion to receive the cage therein and an air nozzle to fit within the end of the cage.

A bottom removal bag assembly embodiment is disclosed for use with a tube sheet having integral depending collar portions defining the mounting openings for the bag assemblies, the disclosed embodiment including an improved bag, cage and nozzle mounting and support arrangement comprising permanent bottom removal support structure having facilities for attachment both to the cage and to the nozzle and including stepped diameter wall structure defining a reduced upper end portion merging with a lower main body portion to define an upwardly facing intermediate shoulder portion, the upper end portion projecting in force-fit relation into the integral tube sheet collar with the intermediate shoulder portion engaged axially against the collar and the main body portion being generally aligned with the collar and having a horizontal exterior locking groove, securing means for fixing the upper end portion directly to the collar to transmit support loads into the tube sheet collar, and clamping means detachably encircling the bag and cage between the top and intermediate cage rings to collapse the cage circumferentially into mounted position wherein the top ring establishes a circumambient seal between the top fold and the collar and the intermediate ring enters the groove of the support structure in axially interlocked relation to transmit cage loads to the integral collar through the support structure.

The support being primarily for carrying the cage load may be formed of strip material secured by an axial seam or may be an open wire framework since the critical seal is effected between the integral collar and the top fold of the bag.

Other features and advantages of the invention will be apparent from the following description and claims and are illustrated in the accompanying drawings which show structure embodying preferred features of the present invention and the principles thereof, and what is now considered to be the best mode in which to apply these principles.

BRIEF DESCRIPTION OF DRAWINGS

In the accompanying drawings forming a part of the specification, and in which like numerals are employed to designate like parts throughout the same, FIG. 1 is a fragmentary perspective view of a portion of a dust collector incorporating a bottom removal bag assembly in accordance with this invention;

FIG. 2 is an enlarged transverse sectional view taken substantially along line 2 — 2 of FIG. 1;

FIG. 3 is an enlarged fragmentary side elevational view showing the particular cage ring arrangement used in the illustrated embodiment.

FIG. 4 is a perspective view of one form of support structure; and

FIG. 5 is an elevational view of another form of support structure.

DESCRIPTION OF THE PREFERRED EMBODIMENTS

Referring first to FIGS. 1 and 2, a portion of a perforated tube sheet 10 is illustrated with separate mounting openings for each filter unit 11. Tube sheet 10 is suitably mounted in a dust collector (not shown) and has secured thereto, in sealing relation in each mounting opening, a bottom removal type filter unit consisting of a suspended bag, cage and nozzle assembly 12 one of which is shown complete with the usual skeletal cage 13, a surrounding sleeve-like bag 14 suspended therefrom and a venturi-type air nozzle 15.

In accordance with this invention, the tube sheet is provided with depending integral collar portions 10 C to define the mounting openings. The collars 10 C are drawn from the tube sheet stock and typically may be about ⅝–1 inch long for a 5½ inch diameter mounting hole.

The cage is of a conventional elongated skeletal form and includes a set of internal wire rings interconnected by a set of circumferentially spaced lengthwise extending external wire rods 13 E. The cage 13 as shown in FIG. 3 has a top split ring 13 T that includes an axially offset end extension 13 A to define a 360° (+) split ring having overlapping ends. The cage 13 has a C-shaped ring 13 C spaced from the top and having a gap aligned with the overlap of the split ring with the remaining rings 13 I being of the closed type. Thus, the top section of the cage can be contracted between a loose configuration during assembly and removal and a tight configuration for sealing.

The bag 14 which may be of any suitable filter media fabric is shown to include an open end sleeve portion 14 S that is folded inwardly over the top of the cage to provide a seal flap 14 F sandwiched between the integral tube sheet collar 10 C and the top section of the cage.

The air nozzle 15 which is here shown as being of a venturi-type may be of any conventional type and includes a mounting flange 15 F bordering its top end.

In accordance with this invention, a permanent bottom support structure 20 is provided for attachment both to the cage 13 and to the nozzle 15. In the embodiment best shown in FIGS. 2 and 4, the support is formed from strip stock sheet material to provide a generally cylindrical stepped diameter wall structure having a reduced upper end portion 21 merging with a lower main body portion 22 to define an upwardly facing intermediate shoulder portion 23. The upper end portion is sized to project in force-fit relation into the integral tube sheet collar 10 C to engage the shoulder 23 axially against the collar and to align the main body portion 22 with the collar 10 C.

The force fit mounting relationship maintains the parts in temporarily assembled relation to facilitate permanent securement of the support 20 to the collar 10 C by a series of spot welds W.

The main body portion 22 of the support has an exterior locking groove 22 G arranged to receive the C-shaped intermediate cage ring 13 C in positive axially interlocking relation when the cage is contracted into its finally assembled position.

The upper portion of the support has internal top flanges 21 F for connection to the flange 15 F of the venturi nozzle by suitable fasteners such as rivets R.

After the support 20 is fixed in place within the collar 10 C and the nozzle 15 is attached, the filter assembly consisting of the cage 13 with the bag 14 having its seal flap 14 F disposed within the top section of the cage and a conventional adjustable band clamp 24 loosely encircling the upper regions of the bag and cage is fitted onto the collar 10 C and support 20. When the band clamp 24 is tightened, the top section of the cage is contracted to engage the intermediate cage ring 13 C in axially interlocked relation in the support groove 22 G and the 360° (+) top split ring 13 T is contracted into continuous clamping engagement around the integral collar to produce a direct seal between the seal flap 14 F and the tube sheet collar 10 C.

Thus, it may be noted that the simplified support structure carries the load forces and transmits the same directly to the tube sheet to substantially isolate the seal region from the usual load and vibration effects. Correspondingly, the seal is effected directly to the tube sheet collar so that the support need not be of uniform cylindrical shape. Thus, the seam line 20 L shown in the stepped side wall of the support 20 is acceptable.

An alternative embodiment of the support structure 20, as shown in FIG. 5, utilizes an all wire construction consisting of a top closed ring 30 T of reduced diameter and intermediate and bottom closed rings 30 I, 30 B of larger diameter. The upper ring 30 T may be provided with flange portions for connection to the venturi flange 15 F. These rings are connected by externally arranged vertical wires 30 V having aligned intermediate offsets defining shoulder portions 33 to engage axially with the tube sheet collar 10 C. The vertical wires 30 V also have intermediate offsets collectively defining an exterior locking groove 32 G for receiving the intermediate cage ring 13 C.

Thus, the all wire embodiment of FIG. 5 has a generally cylindrical stepped diameter profile having a reduced upper end portion for force fit engagement and welded securement within the tube sheet collar 10 C and a main length portion for axial alignment with the collar 10 C.

Thus, while preferred constructional features of the invention are embodied in the structure illustrated herein, it is to be understood that changes and variations may be made by those skilled in the art without departing from the spirit and scope of the appended claims.

What is claimed is:

1. In a reverse blow-back dust collector that includes a tube sheet having a plurality of depending integral collar portions each defining a mounting opening and a separate bag assembly for each mounting opening, each bag assembly including an elongated skeletal cage, an elongated bag having an open end-sleeve portion to receive the cage therein, and an air nozzle to fit within one end of the cage, an improved bag, cage and nozzle mounting and support arrangement wherein said cage includes a 360° (+) split ring having overlapping ends at the top thereof and disposed within a top fold of the end-sleeve portion for biasing the top fold inwardly into sealing contact with the integral collar and a C-shaped intermediate ring, having a gap in general alignment with the overlapping ends, permanent hollow bottom support structure for attachment both to the cage and to the nozzle and including stepped diameter structure defining a reduced upper end portion and a main body portion, said upper end portion projecting in force-fit relation into the integral tube sheet collar portion said nozzle is attached to said support structure and said main body portion being generally aligned with the collar and having a horizontal exterior locking groove, and said C-shaped intermediate ring is positioned adjacent said groove, securing means for fixing the upper end portion directly to the integral collar to transmit support structure loads into the tube sheet collar, and clamping means detachably encircling the bag and cage between said top and intermediate rings to collapse said cage into mounted position wherein said top ring establishes a 360° (+) seal between the top fold and the tube sheet collar and said intermediate ring enters the groove in interlocking relation to transmit cage loads to the integral collar through the support structure.

2. In an arrangement as defined in claim 1 and wherein said bottom support structure is comprised of strip stock sheet material of generally cylindrical final form and which has an end seam extending generally vertically thereof.

3. In an arrangement as defined in claim 1 and wherein said bottom support structure is in the form of a cage having a plurality of horizontal rings interconnected by a plurality of vertical wires.

* * * * *